UNITED STATES PATENT OFFICE.

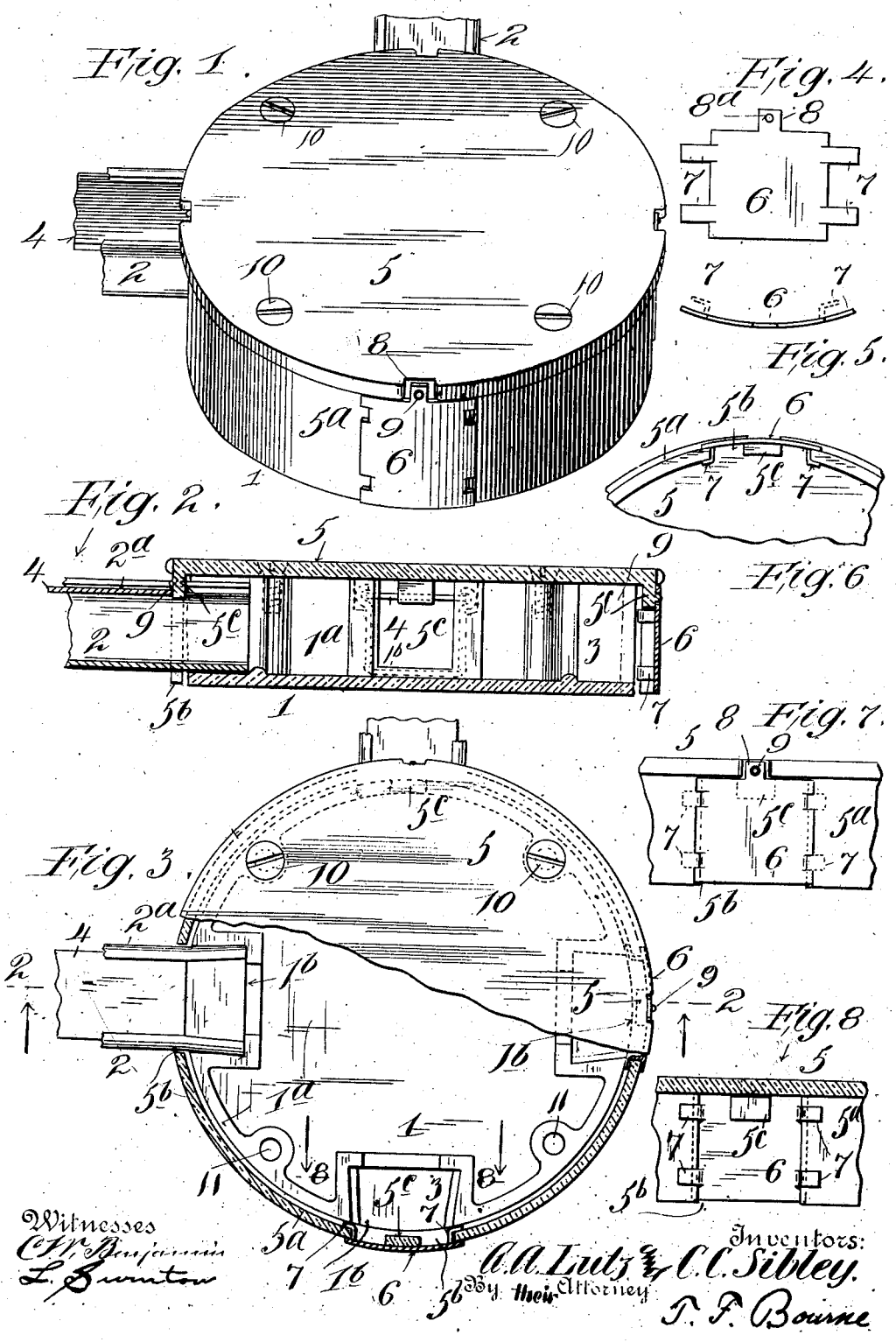

GEORGE A. LUTZ, OF NEW YORK, N. Y., AND CLARENCE C. SIBLEY, OF PERTH AMBOY, NEW JERSEY.

OUTLET OR JUNCTION BOX.

1,099,986. Specification of Letters Patent. Patented June 16, 1914.

Application filed July 19, 1906, Serial No. 326,824. Renewed May 16, 1910. Serial No. 561,721.

*To all whom it may concern:*

Be it known that we, GEORGE A. LUTZ and CLARENCE C. SIBLEY, citizens of the United States, and residents, respectively, of New York city, borough of Brooklyn, New York, and Perth Amboy, Middlesex county, New Jersey, have invented certain new and useful Improvements in Outlet or Junction Boxes, of which the following is a specification.

This invention relates to improvements in outlet or junction boxes employed in electric circuits for making branch connections, etc., and has for its object to provide simple and efficient means to conceal and protect the outlet openings of the box when not in use, and to permit ready access to said outlet openings for making connections therewith, without danger of injury to the box.

This invention comprises a box of suitable shape provided with outlet openings in its sides for the passage of conductors, with a cover provided with a flange adapted to receive and encircle the box and having openings adapted to aline with the outlet openings in the box, and the openings of the flange are provided with caps or covers detachably connected therewith in such manner as to normally remain in position to close the opening of the flange, and to be readily removed by merely pulling them away from the flange without injury thereto.

The invention also comprises the novel details of improvement that will be more fully hereinafter set forth and then pointed out in the claims.

Reference is to be had to the accompanying drawings forming part hereof, wherein, Figure 1 is a perspective view of an outlet or junction box embodying this invention, Fig. 2 is a cross section on the line 2, 2, in Fig. 3, Fig. 3 is a sectional plan view of a box, part of the cover being removed, Fig. 4 is a face view, and Fig. 5 is an edge view, of the cap or plate for closing the openings in the flange of the cover, Fig. 6 is a detail view of a portion of the cover looking from the under side thereof; Fig. 7 is a detail side view of a portion of the cover, showing its detachable cap or plate in position, and Fig. 8 is a detail section taken substantially on the line 8, 8, in Fig. 3, looking in the direction of the arrows.

Similar numerals of reference indicate corresponding parts in the several views.

The box 1 may be of any suitable construction and is shown provided with a bottom, and with side walls $1^a$ having outlet openings at $1^b$ with which suitable conduits 2 may be connected. In the example shown the conduits 2 are of well known channel form, and adapted to fit at their ends in pockets or recesses 3 formed in the box 1, and said conduits are shown of the class having removable covers 4 which may be held upon the conduits by sliding in opposed grooves $2^a$, or in any suitable manner. The general construction of the box 1 shown in the drawings is of the class illustrated in Letters Patent for outlet or junction box, issued to us July 27, 1909, No. 929,097. The cover 5 has a dependent flange or rim $5^a$, adapted to fit over and inclose the box 1, as illustrated in Figs. 2 and 3, and said flange or rim is provided with openings $5^b$ adapted to aline with the openings $1^b$ in box 1, the openings $5^b$ in flange $5^a$ being shown extending through the lower edge thereof. At 6 are caps or plates adapted to fit over or within the openings $5^b$ of the flange $5^a$ so as to normally close the same and thereby close the openings $1^b$ of the box when the cover is thereon. Means are provided to detachably connect caps 6 with flange $5^a$, and for this purpose said caps are shown of width greater than the width of openings $5^b$ so as to rest at their edges against the edges of said openings, and said caps are provided with lugs or ears 7, shown stamped out or formed with the material of the caps 6, and said lugs or ears are shown bent back through the openings $5^b$ and against the inner surface of flange $5^a$ so that the marginal portions of the caps and the lugs 7 will conjointly act to detachably retain the caps in place. The lugs or ears may be suitably bent when the caps 6 are made so that by simply sliding the caps into place through the lower open parts of openings $5^b$ they may be attached to and detached from flange $5^a$. To retain the caps 6 in place against inadvertent removal said caps are shown provided with extensions 8 adapted to co-act with projections 9 upon cover 5 or flange $5^a$, and said extensions may have reentrant parts, such as depressions or holes $8^a$ to receive projections 9.

Depending from the cover 5 are lugs $5^c$ alined with the openings $5^b$ of flange $5^a$ and in position to be engaged by the covers 4 of the conduits to prevent said covers from being pushed too far in box 1.

The cover 5 may be removably held upon box 1 by screws 10 entering threaded holes 11 in the box, or in any other suitable manner.

The box 1 and its cover 5 with flange 5ª may be made of cast metal, and the caps or closures 6 may be stamped out of sheet metal, and when completed the caps may be fitted upon the flange and the cover secured over the box. When connection is to be made with conduits the cover 5 will be removed from the box and the conduits fitted in the sockets 3 of the openings 1ᵇ of the box, and the corresponding caps 6 will then be removed from the flange 5ª, and when the cover is attached to the box the openings 5ᵇ of flange 5ª pass over and receive the conduits 2. The remaining caps will then conceal and protect the holes 1ᵇ in the box to which conduits have not been fitted. When any other conduits are to be attached to the box the cover may be removed and the corresponding cap detached and the cover replaced in the manner stated.

By means of the arrangement described an outlet box may be provided that is efficient in use, in which the caps for the outlet openings may be readily removed without requiring the breaking away of any integral part of the box or cover, and thereby danger of injuring the same is avoided.

This invention is not limited to the details shown and described as they may be varied without departing from the spirit of the invention.

We claim—

1. In an outlet or junction box, the combination of a box provided with outlet openings, with a cover having a flange fitting around said box and provided with openings adapted to aline with said outlet openings, caps fitting the openings of said flange, and means for slidably detachably connecting said caps with said flange.

2. In an outlet or junction box, the combination of a box provided with outlet openings, with a cover having a flange fitting around said box and provided with openings adapted to aline with said outlet openings, and caps fitting the openings of said flange, said caps being provided with groove-like portions adapted to receive the edges of the openings of the flange to enable the caps to be slid into place at said openings.

3. In an outlet or junction box, the combination of a box provided with outlet openings, with a cover having a flange fitting around said box and provided with openings adapted to aline with said outlet openings, caps fitting the openings of said flange, said caps being provided with groove-like portions adapted to receive the edge of the openings of the flange, and complemental projecting and recessed portions on the cover and the caps respectively to detachably retain the latter upon the former.

4. In an outlet or junction box, the combination of a box provided with outlet openings, with a cover provided with a flange having openings that are open through the lower edge and adapted to aline with said outlet openings, and caps for the openings of the flange provided with bent lugs to engage the edges of the flange to enable the caps to be slid into place through the lower open edge of the flange.

5. In an outlet or junction box, the combination of a box provided with outlet openings, with a cover provided with a flange having openings adapted to aline with said outlet openings, caps for the openings of the flange provided with bent lugs to engage the edges of the flange, and complemental projecting and recessed portions on the cover and the caps respectively to detachably retain the latter upon the former.

6. In an outlet or junction box, the combination of a box having outlet openings, with a cover having a flange extending wholly around and inclosing the box and provided with openings adapted to aline with said outlet openings, and caps fitted over the flange openings and overlying the edges of the flange at said openings, said caps having lugs bent against the opposite wall of the flange to detachably connect the caps with the flange.

7. In an outlet or junction box, the combination of a box having outlet openings, with a cover having a flange provided with openings adapted to aline with said outlet openings, caps fitted over the flange openings and overlying the edges of the flange at said openings, said caps having lugs bent against the opposite wall of the flange to detachably connect the caps with the flange, said caps having extensions and complemental holding devices between said extensions and the cover to detachably retain the caps upon the cover.

8. In an outlet or junction box, the combination of a box having outlet openings, with a cover having a flange provided with openings adapted to aline with said outlet openings, caps fitted over the flange openings and overlying the edges of the flange at said openings, said caps having lugs bent against the opposite wall of the flange to detachably connect the caps with the flange, said caps having extensions provided with recessed parts and the cover having projections to receive the recessed parts to detachably retain the caps upon the cover.

9. In an outlet or junction box the combination of a box provided with outlet openings, with a cover having a flange fitting around said box and provided with openings to aline with said outlet openings, closures fitting the openings of said flange, and means for detachably connecting said closures with said flange.

10. In an outlet or junction box, the combination of a box provided with outlet openings, with a cover having a flange fitting around said box and provided with openings adapted to aline with said outlet openings, and closures fitting the openings of said flange, said closures being provided with groove-like portions adapted to receive the edges of the openings of the flange.

11. In an outlet or junction box, the combination of a box provided with outlet openings, with a cover provided with a flange having openings adapted to aline with said outlet openings, and closures for the openings of the flange provided with bent lugs to engage the edges of the flange at its opening.

GEO. A. LUTZ.
CLARENCE C. SIBLEY.

Witnesses:
T. F. BOURNE,
L. SWINTON.